INVENTORS.
Wayne L. Maddox
Robert L. Coleman
Wilbur D. Shults II

ATTORNEY.

INVENTORS.
Wayne L. Maddox
Robert L. Coleman
Wilbur D. Shults II

BY

ATTORNEY.

United States Patent Office 3,744,974
Patented July 10, 1973

3,744,974
LOADING DISK FOR PHOTOMETRIC ANALYZER OF ROTARY CUVETTE TYPE
Wayne L. Maddox, Oak Ridge, Tenn., Robert L. Coleman, Boston, Mass., and Wilbur D. Shults II, Oak Ridge, Tenn., assignors to the United States of America as represented by the United States Atomic Energy Commission
Filed Nov. 30, 1971, Ser. No. 203,248
Int. Cl. G01n 1/10, 21/00; B04b 5/12
U.S. Cl. 23—259                             5 Claims

ABSTRACT OF THE DISCLOSURE

A loading disk characterized by extremely rapid and efficient mixing and liquid transfer is provided for use in a photometric analyzer of the rotary cuvette type. The disk, which is adapted to be centrally disposed within a cuvette rotor housing an annular array of sample analysis cuvettes, facilitates loading, mixing, and transfer of individual samples and reagents to respective cuvettes where photometric analysis takes place. The loading disk defines an annular array of sample and reagent chambers or cavities with one pair of adjacent chambers being provided to supply each respective sample analysis cuvette. Each pair of chambers is adapted to receive and retain separate volumes of sample and reagent liquids when the loading disk and cuvette rotor are stationary and to discharge the liquids when the loading disk and rotor are rotated. Mixing chambers, one for each pair of sample and reagent chambers, are disposed radially outward from the sample and reagent chambers on radii positioned angularly intermediate the chambers in each respective pair of chambers. First passageways connect, in parallel, the sample and reagent chambers in each pair of chambers to corresponding mixing chambers. Second passageways provide discharge means from the mixing chambers to respective cuvettes. Rotation of the loading disk and cuvette rotor causes the liquids in each pair of sample and reagent chambers to flow in parallel from those chambers, through the first passageways to the mixing chambers where they are mixed, and then through the second passageways to respective sample analysis cuvettes for photometric analysis.

BACKGROUND OF THE INVENTION

The invention described herein relates generally to photometers and more particularly to an improved loading disk for a photometric analyzer of the rotary cuvette type. It was made in the course of, or under, a contract with the U.S. Atomic Energy Commission.

The need for a photometric system capable of rapidly performing analyses on a large number of discrete samples has long existed in clinical and analytical laboratories. Qualitative and quantitative measurements of metabolites, hormones, vitamins, enzymes, minerals, body waste products, bile constituents, gastric contents, etc., are made daily in great numbers in such laboratories in the diagnosis of disease as well as for research purposes. A system which can perform measurements of this type rapidly, accurately, and cheaply will effect large manpower and cost savings while providing improved results. Most prior-art instruments are capable of performing analyses only in sequence rather than simultaneously. Not only does sequential analysis limit the analytical production, but, in the case of analyzing very small samples, the results are usually unreliable.

One device which was designed to obviate the above-described deficiencies is described in U.S. Pat. No. 3,555,284, issued to common assignee on Jan. 12, 1971, in the name of Norman G. Anderson. In that device a central loading disk is provided for receiving liquid samples and reactants prior to operation. An annular array of cuvettes is disposed about the loading disk for receiving the liquids from the loading disk and holding them for photometric analysis. Rotation of the loading disk and cuvettes causes the liquid samples and reactants to flow from the loading disk to the cuvettes where they are photometrically analyzed while the entire system of cuvettes and loading disk is rotating.

The loading disk described in the aforementioned patent consists of three concentric annular arrays of chambers, the chambers in each array being interconnected, in series, with corresponding chambers in adjacent arrays. Rotation of the loading disk causes sample and reagent liquids in the two innermost arrays of chambers to flow into the outermost array of chambers and then outward through a discharge passage into corresponding cuvettes. Such arrangement, although generally satisfactory, sometimes permits cross contamination of samples due to acceleration induced overflow from the open chambers. In addition, relatively low mixing efficiencies result from the series arrangement of chambers since liquid from the radially innermost array of chambers must travel farther to reach the cuvettes and must overtake the liquid from the radially intermediate array of chambers before mixing can occur. With both liquids moving in the same direction, inefficient mixing occurs even after the two liquids are contacted. In some cases it has been found necessary to augment mixing by employing additional techniques such as drawing air bubbles through the cuvettes.

Using prior-art loading disks, accurate reproducible measurements of very short-lived time-dependent reactions such as certain bio- and chemi-luminescent reactions were not possible due to their poor mixing efficiencies.

It is, accordingly, a general object of the invention to provide an improved loading disk for a photometric analyzer of the rotary cuvette type characterized by rapid mixing of sample and reagent liquids.

Another object of the invention is to provide an improved loading disk for a photometric analyzer of the rotary cuvette type wherein individual samples are not subjected to acceleration-induced cross contamination.

Other objects of the invention will be apparent from an examination of the following description of the invention and the appended drawings.

SUMMARY OF THE INVENTION

In accordance with the invention, an improved loading disk is provided for use in a photometric analyzer of the rotary cuvette type. The disk, which is adapted to be centrally disposed within a cuvette rotor housing an annular array of sample analysis cuvettes, facilitates loading, mixing, and transfer of individual samples and reagents to respective cuvettes where photometric analysis takes place. The loading disk defines an annular array of sample and reagent chambers with pairs of adjacent chambers in the array being adapted to supply each sample analysis cuvette. Each pair of adjacent chambers is adapted to receive and retain separate volumes of sample and reagent liquids when the loading disk and cuvette rotor are stationary and to discharge the liquids in parallel when the loading disk and cuvette rotor are rotated. Mixing chambers, one for each pair of sample and reagent chambers, are disposed radially outward from the sample and reagent chambers on radii positioned angularly intermediate the chambers in each respective pair of chambers. First passageways connect, in parallel, the sample and reagent chambers in each pair of chambers to corresponding mixing chambers. Second passageways provide discharge means from the mixing chambers to respective cuvettes. Rotation of the loading disk and cuvette rotor causes the liquids in each pair of sample and reagent chambers to flow in parallel from those chambers, through the first passageways to the mixing chambers where they are mixed, and then through the second passageways to respective sample analysis cuvettes for photometric analysis. The subject improved loading disk results in more rapid transfer of liquid to the sample analysis cuvettes with improved mixing efficiency while eliminating cross contamination between samples. Accurate, reproducible, and rapid photometric analyses of certain short-lived time-dependent reactions, heretofore impossible, can now be performed on a routine basis.

DESCRIPTION OF THE PREFERRED EMBODIMENT

Figure 1:
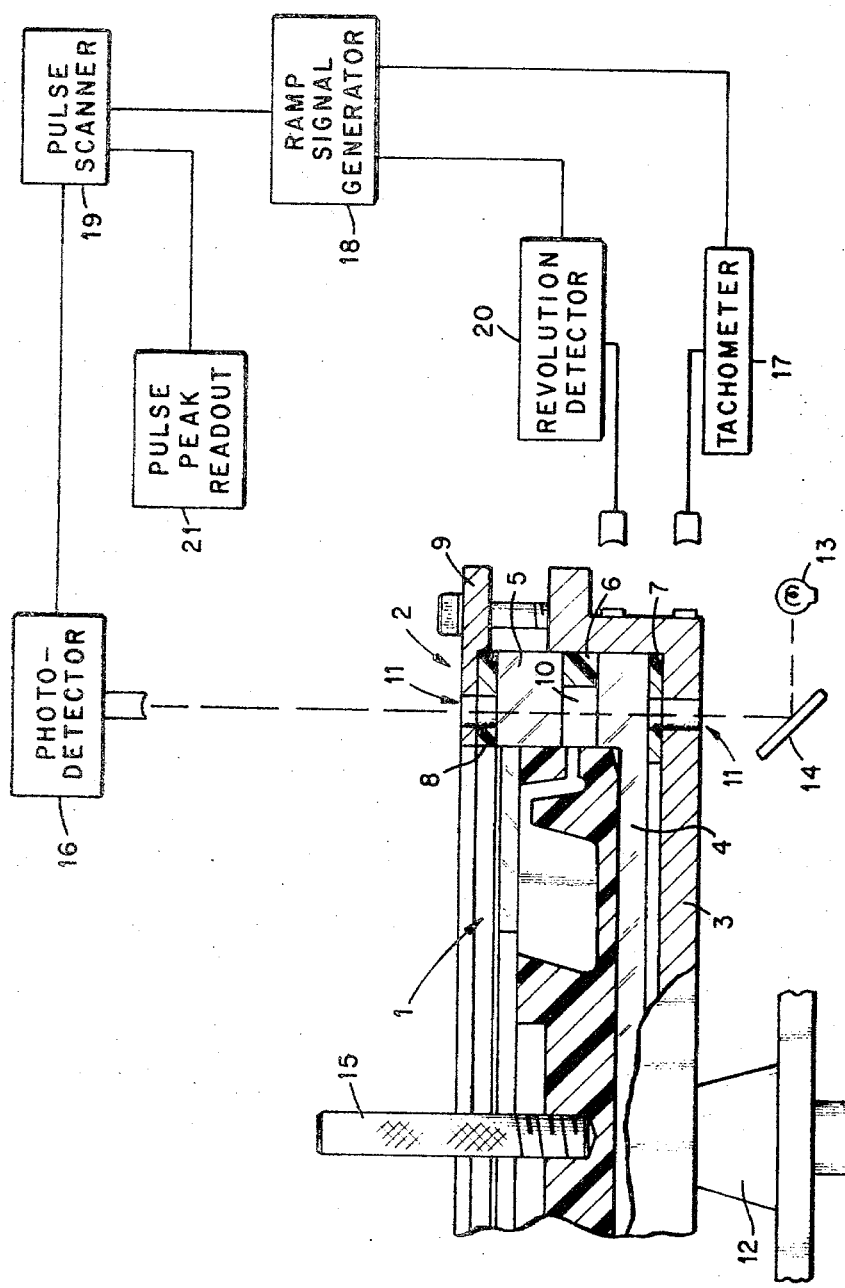
FIG. 1 schematically illustrates a photometric analyzer utilizing the subject improved loading disk.

Referring now to the drawings, initially to FIG. 1, an analyzer of the rotary cuvette type incorporating a loading disk 1 make in accordance with the invention is shown in a simplified schematic manner. A pancake-shaped rotor assembly 2 comprises a bolt flanged steel rotor body 3, glass rings 4 and 5, a slotted polytetrafluorethylene cuvette ring 6, polytetrafluorethylene retaining rings 7 and 8, and a steel bolted flange ring 9. Rings 4, 5, 6, 7, and 8 are compressed between rotor body 3 and flange ring 9 to form a multiplicity of radially oriented cuvettes 10 in slotted cuvette ring 6. Spaced-apart holes 11, axially aligned with cuvettes 10, are provided in rotor body 3, retaining rings 7 and 8, and flange ring 9 so as to provide axially extending passageways permitting passage of a light beam through the cuvettes. A motor drive 12 supports rotor assembly 2 as well as rotating it during operation.

A photometric light source and projecting means is provided to project a light beam of constant intensity intersecting rotor assembly 2 at a point corresponding to the radial positions of cuvettes 10 and holes 11. The light beam is aligned in such a manner so as to be transmitted through each hole 11 and cuvette 10 as they pass through the beam. The photometric light source comprises an incandescent lamp 13 with a reflecting mirror 14 disposed below the rotor assembly and angled to reflect the light upward, substantially normal to the rotor plane of rotation. A handle 15 threadably engages the center of the loading disk 1 to facilitate its removal from rotor assembly 2.

Electronic photodetecting means 16 is disposed above rotor assembly 2 and aligned to receive light transmitted through the cuvettes during rotation. Photodetecting means 16 is designed to respond electronically with an output which is proportional to the intensity of the light transmitted through the cuvettes. Photodetecting means 16 comprises a photomultiplier tube disposed directly above the cuvette circle to receive all light transmitted upwardly through the axially aligned openings.

The remaining electronic components illustrated schematically in FIG. 1 include a proportional tachometer 17 which supplies a voltage signal proportional to the rotor speed to a ramp signal generator 18 which, in turn, provides a signal to a pulse scanner 19. A revolution detector 20 synchronizes the ramp signal frequency with the rotor speed. Pulse scanner 19, synchronizable by the ramp signal generator frequency, responds proportionately to pulses originating in photodetecting means 16 and sorts the pulses therefrom as to origin. Pulse peak readout means 21 continuously and simultaneously indicates phototransmittance of the liquid contents of each cuvette. Electronic components 16 through 21 are described in greater detail in U.S. Pat. No. 3,514,613, issued to common assignee on May 26, 1970, in the name of Douglas N. Mashburn.

Figure 3:
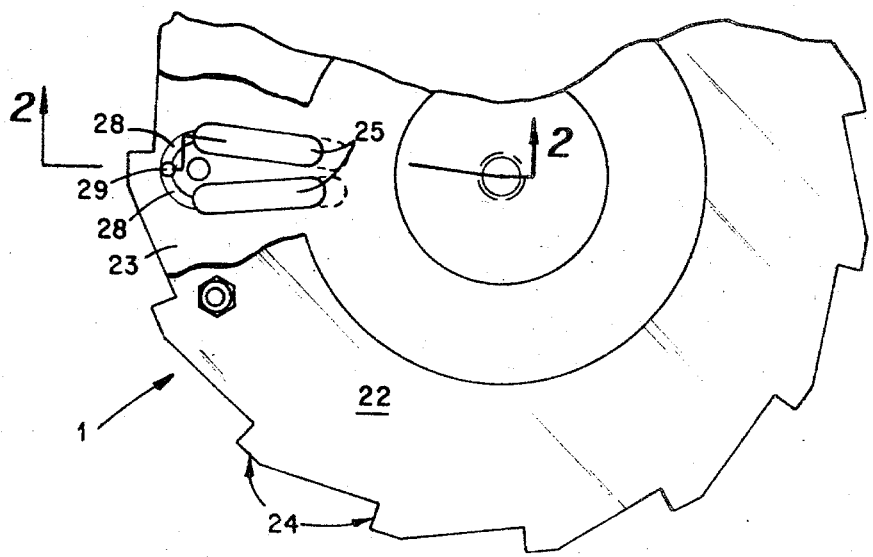
FIG. 3 is a plan view, partially cut away, of the loading disk of FIG. 2.
Figure 2:
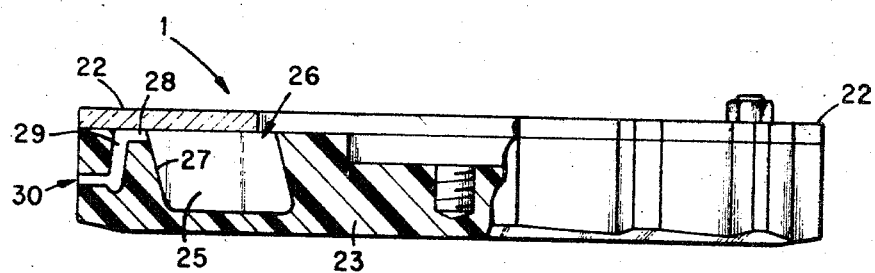
FIG. 2 is an enlarged side view, partially sectioned, of an improved loading disk made in accordance with the invention.

Referring now to the detailed views of FIGS. 2 and 3, transfer disk 1 comprises an annular transparent plastic cover plate 22 bolted to a polytetrafluoroethylene body portion 23. As shown in FIG. 3, the transfer disk is provided with a plurality of teeth-like projections 24, designed to mate with corresponding indentations in cuvette ring 6 and thereby prevent relative rotation between the disk and rotor assembly 2. A circular array of elongated sample and reagent receiving chambers 25 (only two of 30 shown) are machined into the top surface of body portion 23 along radii extending from the center of rotation of the disk and rotor assembly. As shown, cover sheet 22 does not completely cover chambers 25 so that a fill hole 26 is provided at the radially innermost end of each chamber. The radially outermost wall 27 of each chamber 25 is inclined about fifteen degrees with respect to the vertical axis of the disk to facilitate flow out of the chambers as the disk is rotated about that axis. First passageways 28 extend from the upper outer periphery of a pair of chambers 25 to a mixing chamber 29 in the form of a generally cylindrical cavity inclined about five degrees with respect to the vertical axis of the disk. Inclination of mixing chamber 29 facilitates flow of the mixed sample and reagent to the bottom of the chamber, where it discharges through radially extending second passageways 30 into sample analysis cuvettes 10.

As shown in FIG. 3, it is preferred that first passageways 28, joining a pair of sample and reagent chambers 25 to a mixing chamber 29, intersect mixing chamber 29 in a diametrically opposed manner to facilitate sample and reagent mixing. The parallel flow of sample and reagent liquids from a pair of chambers 25 results in the two liquids being directed against each other as they enter mixing chamber 29 from opposite sides, thereby ensuring rapid and complete mixing of the sample and reagent prior to their passage into a cuvette for photometric analysis.

As noted in the preceding background discussion, extremely rapid mixing of reagents and samples is important in certain bio- and chemi-luminescent reactions which are very short lived. An example of the type of chemiluminescent reaction in which the subject system is useful is the assay procedure for adenosine triphosphate (ATP). This determination is of great importance because of the fact that ATP serves as the primary energy transfer intermediate for the synthesis of new cellular material. The extraction and subsequent assay of ATP is thus a vital requirement in evaluation of biological activity in living organisms. Using the subject loading disk and a rotary cuvette system as described in reference to FIG. 1, the reagents luciferase and luciferin are mixed with test samples with resultant production of light pulses in the presence of ATP. Where, as here, the reaction itself produces light which is to be measured, the light source and projecting means as illustrated in FIG. 1 are not used, as it is desired that photodetecting means 16 measure only that light generated by the reaction itself.

The above description of one embodiment of the invention is offered for illustrative purposes only and should not be interpreted in a limiting sense. For example, the loading disk may be fabricated with more or fewer pairs of chambers for receiving sample and reagent liquids and those chambers may vary from the particular shape illustrated. The relative sizes of the chambers for receiving sample and reagent liquids may also be varied depending upon the relative volumes of sample and reagent liquids needed in the reactions of interest. It is intended, rather, that the invention be limited only by the scope of the appended claims.

What is claimed is:

1. In a photometric solution analyzer wherein a loading disk is centrally disposed within a cuvette rotor housing an annular array of sample analysis cuvettes for supplying mixtures of samples and reagents to said cuvettes, the improved loading disk comprising a generally disk-shaped member defining:
   an annular array of receiving chambers adapted to receive and retain liquid samples and reactants when said loading disk is stationary and to discharge said samples and reagents when said loading disk is rotated;
   an annular array of mixing chambers disposed radially outward from said receiving chambers on radii positioned angularly intermediate said receiving chambers;
   a multiplicity of first passageways connecting, in parallel, pairs of said receiving chambers with respective mixing chambers; and
   a multiplicity of second passageways connecting said mixing chambers with respective sample analysis cuvettes in said cuvette rotor.

2. The improved loading disk of claim 1 wherein said first passageways connecting pairs of said receiving chambers with respective mixing chambers open, respectively, into diametrically opposed sides of said mixing chambers.

3. The improved loading disk of claim 1 wherein said mixing chambers comprise generally cylindrical cavities inclined with respect to the axis of said disk-shaped member.

4. The improved loading disk of claim 1 wherein said receiving chambers comprise elongated radially oriented cavities.

5. In a photomatric solution analyzer wherein a loading disk is centrally disposed within a cuvette rotor housing an annular array of sample analysis cuvettes for supplying mixtures of samples and reagents to said cuvettes, the improved loading disk comprising:
   (a) a disk-shaped body portion defining:
      a circular array of elongated, radially oriented cavities open to one side of said body portion;
      a circular array of generally cylindrical mixing chambers disposed radially outward from and concentrically with said circular array of cavities;
      a multiplicity of first passageways extending between cavities in said circular array of cavities and said mixing chambers, said first passageways joining, in parallel, pairs of said cavities to individual mixing chambers in said circular array of mixing chambers, pairs of said first passageways intersecting said mixing chambers at diametrically opposed sides thereof; and
      a multiplicity of second passageways connecting said mixing chambers with respective sample analysis cuvettes in said cuvette rotor; and
   (b) an annular cover plate affixed to said disk-shaped body portion so as to partially cover said circular array of cavities.

References Cited

UNITED STATES PATENTS

| | | | |
|---|---|---|---|
| 3,586,484 | 6/1971 | Anderson | 23—259 X |
| 3,681,029 | 8/1972 | Shapiro | 23—259 |

MORRIS O. WOLK, Primary Examiner

R. E. SERWIN, Assistant Examiner

U.S. Cl. X.R.

23—253 R; 233—26; 250—218